(12) United States Patent
Kitazato et al.

(10) Patent No.: US 8,931,024 B2
(45) Date of Patent: Jan. 6, 2015

(54) RECEIVING APPARATUS AND SUBTITLE PROCESSING METHOD

(71) Applicant: Sony Corporation, Tokyo (JP)

(72) Inventors: Naohisa Kitazato, Tokyo (JP); Yoshiharu Dewa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/710,989

(22) Filed: Dec. 11, 2012

(65) Prior Publication Data

US 2013/0219444 A1 Aug. 22, 2013

(30) Foreign Application Priority Data

Feb. 17, 2012 (JP) ................................. 2012-033007

(51) Int. Cl.
*H04N 5/278* (2006.01)
*H04N 21/43* (2011.01)

(52) U.S. Cl.
CPC ................................. *H04N 21/4305* (2013.01)
USPC ............. 725/110; 725/40; 386/200; 348/461; 348/464; 348/468

(58) Field of Classification Search
None
See application file for complete search history.

(56) References Cited

U.S. PATENT DOCUMENTS

| | | | |
|---|---|---|---|
| 2001/0037510 A1* | 11/2001 | Lee ................................. | 725/109 |
| 2002/0122138 A1* | 9/2002 | Fukuda .......................... | 348/564 |
| 2002/0140863 A1* | 10/2002 | Park .............................. | 348/564 |
| 2003/0216922 A1* | 11/2003 | Gonzales et al. ............. | 704/260 |
| 2004/0168203 A1* | 8/2004 | Seo et al. ....................... | 725/135 |
| 2005/0162551 A1* | 7/2005 | Baker ............................ | 348/468 |
| 2006/0170819 A1* | 8/2006 | Lim et al. .................... | 348/385.1 |
| 2006/0176963 A1* | 8/2006 | Barthel et al. ............ | 375/240.28 |
| 2007/0136777 A1* | 6/2007 | Hasek et al. .................. | 725/114 |
| 2008/0066138 A1* | 3/2008 | Bishop et al. ................. | 725/137 |
| 2011/0069223 A1* | 3/2011 | Nishikawa et al. ........ | 348/425.4 |
| 2012/0036277 A1* | 2/2012 | Stokking et al. ............. | 709/231 |

FOREIGN PATENT DOCUMENTS

JP 2006324779 A * 11/2006

OTHER PUBLICATIONS

U.S. Appl. No. 14/355,349, filed Apr. 30, 2014, Dewa.

* cited by examiner

*Primary Examiner* — Hunter B Lonsberry
*Assistant Examiner* — Cynthia Fogg
(74) *Attorney, Agent, or Firm* — Oblon, Spivak, McClelland, Maier & Neustadt, L.L.P.

(57) ABSTRACT

Provided is a receiving apparatus, including: a program receiving section configured to receive broadcast program data; a program reproduction section configured to reproduce the received program data; a clock functioning as a timer; a subtitle-data obtaining section configured to obtain subtitle data via a network, the subtitle data corresponding to the program data, time to display the subtitle data being previously specified; and a reproduction-time shifting section configured to delay, in a case where the time to display the obtained subtitle data is behind time of the clock, time to reproduce the program data by the program reproduction section for at least a time lag between time to display the subtitle data and time of the clock.

11 Claims, 8 Drawing Sheets

```
<html>
<head>
<style type="text/css">
#subtitleBar{width: 480px; position: absolute; top: 280px;padding: 3px 10px;text-align: center;     ⎫
color:#fff;background-color:#000; font-family:  Helvetica,Arial,sans-serif; font-size: 0.9em; font-  ⎬ 61
weight: bold;min-height:3.6em;}                                                                      │
                                                                                                     │
.v_on{visilibity:visible;}                                                                          │
.v_off{visilibity:hidden;}                                                                          ⎭
</style>
</head>
<body>
...
<video width="640" height="480" controls>                                      ⎫
<source src="arib://xxxxx" type="video/broadcast"/>                            ⎬ 62
<track kind="subtitles" label="English" src="captioning_en.srt" srclang="en"/> │
</video>                                                                       │
<div id="subtitleBar"></div>                                                   ⎭
<script type="text/javascript">
loadTextTrack({videoId:'vid',kind:'subtitles', srclang:'en',targetId:'subtitleBar'});
</script>
<button onclick="document.getElementById("subtitleBar").className='v_on'",">Subtitle       ⎫
On</button> <button                                                                          ⎬ 63
onclick="document.getElementById("subtitleBar").className='v_off',">Subtitle Off</button>   ⎭
</body>
</html>
```

RECEIVING APPARATUS AND SUBTITLE PROCESSING METHOD

BACKGROUND

The present disclosure relates to a receiving apparatus configured to receive and reproduce a broadcast program. Specifically, the present disclosure relates to a receiving apparatus configured to obtain subtitle data corresponding to a broadcast program from a server in a network, and to display the subtitle data in synchronization with the broadcast program. Further, the present disclosure relates to a subtitle processing method by the receiving apparatus.

In general, subtitles corresponding to broadcasted images are broadcasted and transmitted. However, in a case of, for example, providing multilingual subtitles, it is desirable to provide subtitles via the Internet not by broadcasting, from a viewpoint of efficiency.

WebVTT (Video Text Tracks) standard is being widely used as a format for delivering subtitles via the Internet. WebVTT is based on the premise that subtitles are displayed by a browser.

Conventionally, the following technology is disclosed to reproduce subtitles corresponding to a program such that the subtitles and images or sounds of the program are not misaligned. For example, in a case of recording a program, a subtitle-information table is produced in the following manner. That is, one sentence in subtitles is treated as one line, a line number is sequentially assigned, time that has elapsed since the start of recording is correlated to the line number, and a program genre code of the program is further correlated to the line number. In the case of reproduction, a program genre is determined based on the program genre code. An amount of delay is set for each genre. The amount of delay is subtracted from elapsed time. Reproduction of images and sounds is started at the time obtained by subtraction (see, for example, Japanese Patent Application Laid-open No. 2008-172421).

According to Japanese Patent Application Laid-open No. 2008-172421, it is assumed that an elementary stream of subtitles and a transport stream of a program are multiplexed and transmitted. Meanwhile, according to the present technology, subtitles are delivered via the Internet, received, and displayed in synchronization with a broadcast program. That is, the premise of the technology of Japanese Patent Application Laid-open No. 2008-172421 is different from the premise of the present technology.

SUMMARY

In a case where a broadcast program and subtitles delivered via the Internet are displayed in synchronization with each other, specifically if the broadcast program is a so-called live program such as a sport live program or a news program, subtitles delivered via the Internet may be delivered behind broadcasting operationally. So, under such a premise, a problem is how a receiving apparatus displays subtitles and a broadcast program in synchronization with each other.

In view of the above-mentioned circumstances, it is desirable to provide a receiving apparatus and a subtitle processing method capable of displaying subtitles delivered via the Internet and a broadcast program in synchronization with each other.

According to an embodiment of the present disclosure, there is provided a receiving apparatus, including: a program receiving section configured to receive broadcast program data; a program reproduction section configured to reproduce the received program data; a clock functioning as a timer; a subtitle-data obtaining section configured to obtain subtitle data via a network, the subtitle data corresponding to the program data, time to display the subtitle data being previously specified; and a reproduction-time shifting section configured to delay, in a case where the time to display the obtained subtitle data is behind time of the clock, time to reproduce the program data by the program reproduction section for at least a time lag between time to display the subtitle data and time of the clock.

The reproduction-time shifting section may be configured to delay time to reproduce the program data by the program reproduction section for offset time, the offset time being obtained by adding a predetermined margin to a time lag between time to display the subtitle data and time of the clock.

The receiving apparatus may further include a subtitle-reproduction section configured to update the display time previously specified to the obtained subtitle data with time obtained by adding the offset time to the display time, and to display the subtitle data at the updated display time.

Specifically, the reproduction-time shifting section may be configured to convert offset time into a 90 KHz counter value, the offset time being obtained by adding a predetermined margin to a time lag between time to display the subtitle data and time of the clock, and to delay an STC (System Time Clock).

The reproduction-time shifting section may be configured to return the STC to an original value along with end of one of the program data and the subtitle data.

The reproduction-time shifting section may include an STC adjusting section configured to calculate the offset time, and an STC creating section configured to create the STC with reference to a PCR (Program Clock Reference), the PCR being inserted in the broadcast program data and transmitted, and to update the STC with the offset time given from the STC adjusting section.

According to an embodiment of the present technology, there is provided a subtitle processing method, including: receiving broadcast program data; obtaining, by a subtitle-data obtaining section, subtitle data via a network, the subtitle data corresponding to the program data, time to display the subtitle data being previously specified; and delaying, by a reproduction-time shifting section, in a case where the time to display the obtained subtitle data is behind time of a clock, time to reproduce the program data for at least a time lag between time to display the subtitle data and time of the clock.

As described above, according to the present technology, it is possible to display subtitles delivered via the Internet and a broadcast program in synchronization with each other.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a diagram showing an example of description of the HTML5 document, which structures an application in conjunction with broadcasting;

DETAILED DESCRIPTION OF EMBODIMENTS

Hereinafter, an embodiment of the present disclosure will be described with reference to the drawings.

In the current terrestrial digital television broadcasting, subtitles, images, and sounds are multiplexed, and the obtained transport stream is transmitted. In a case where there are a limited number of languages for subtitles, which are transmitted via broadcasting, the following system may be employed. That is, files of subtitle data in various languages are stored in a server in the Internet. A receiving apparatus obtains the files. The receiving apparatus displays subtitles in synchronization with a broadcast program.

Figure 1:
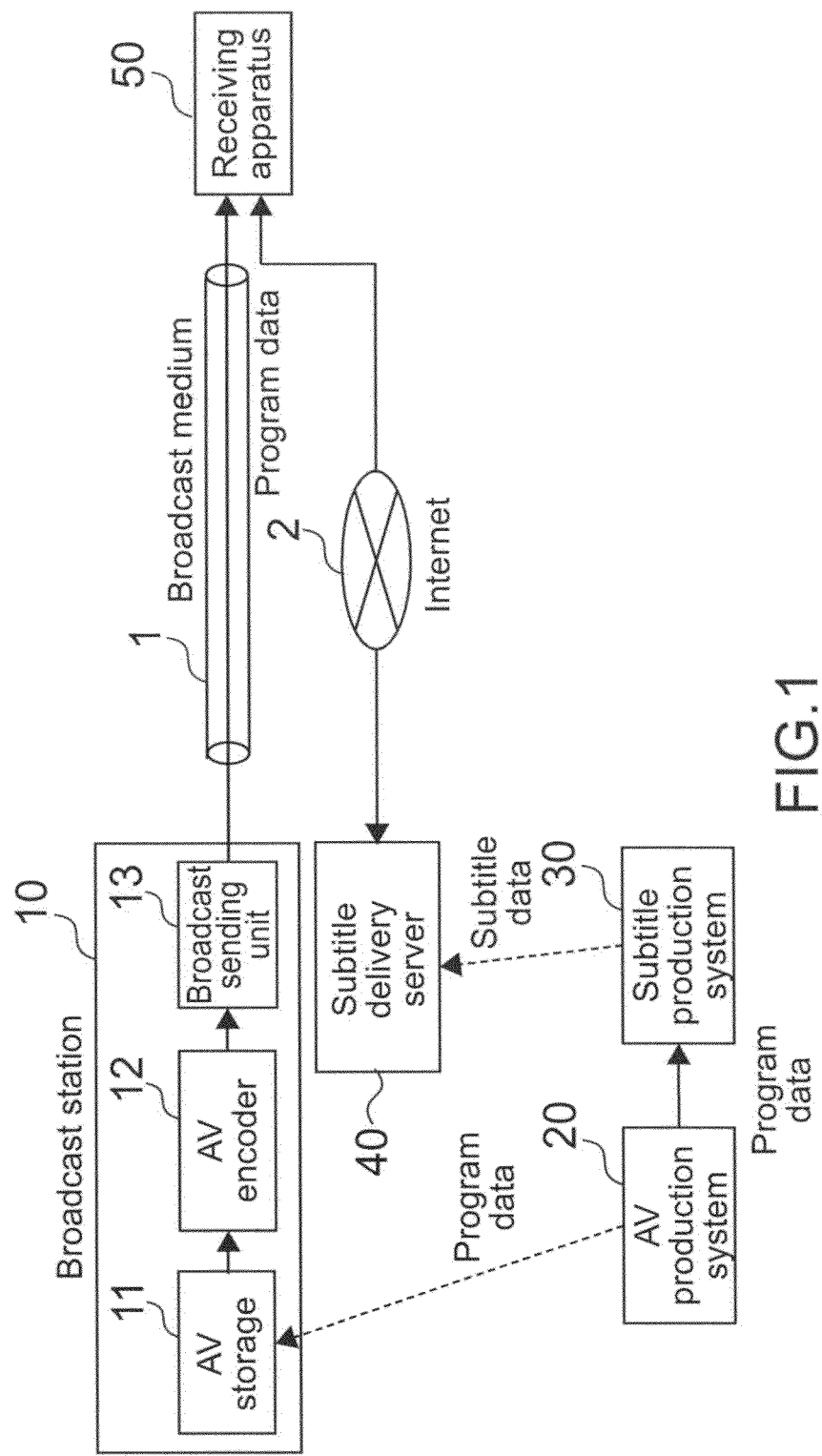
FIG. 1 is a diagram showing a system configured to obtain subtitle data corresponding to a broadcast program from a server in a network, and to display the subtitle in synchronization with the broadcast program.

FIG. 1 is a diagram showing the configuration of such a system.

An AV production system 20 records program data previously. A broadcast station 10 stores the program data in AV storage 11. An AV encoder 12 encodes the program data stored in the AV storage 11. A broadcast sending unit 13 sends the encoded program data via a broadcast medium 1. Meanwhile the program data for broadcasting, which is produced by the AV production system 20, is also provided to a subtitle production system 30. The subtitle production system 30 produces subtitle data for a program. The subtitle production system 30 provides the produced subtitle data to a subtitle delivery server 40. The subtitle delivery server 40 delivers, in response to a request from a receiving apparatus 50, subtitle data for an appropriate broadcast program via a network 2 such as the Internet. Time information is added to the subtitle data. The time information is used to synchronize subtitles and a broadcast program. The time information is information specifying subtitle display time (hereinafter referred to as "specified-display-time".).

The receiving apparatus 50 receives a broadcast program selected by a user. The receiving apparatus 50 reproduces the received broadcast program. In this case, the receiving apparatus 50 downloads a subtitle file, which corresponds to the selected broadcast program, from the subtitle delivery server 40. The size of the subtitle file is relatively small. So it takes a short time to download the subtitle file. Note that the receiving apparatus 50 may download a subtitle file not only when a program is selected but also at other timings.

For example, the receiving apparatus 50 may download files of subtitle data for respective channels from the subtitle delivery server 40 and store the downloaded files immediately after the receiving apparatus 50 is powered on and booted up, during a vacant time, or the like. Then, the receiving apparatus 50 determines a timing to display subtitles based on a specified-display-time for the subtitle data.

In the above-mentioned method, the receiving apparatus 50 obtains a subtitle file for a previously-recorded program from the subtitle delivery server 40. According to this method, a receiving apparatus is capable of obtaining the whole subtitle file in a short time. So displayed subtitles may hardly be late for a program.

However, in a case of live broadcast program, a program is broadcasted and subtitle data is produced at the same time. So it is inevitable that the receiving apparatus obtains and displays subtitle data after corresponding part in a program is broadcasted.

Figure 2:
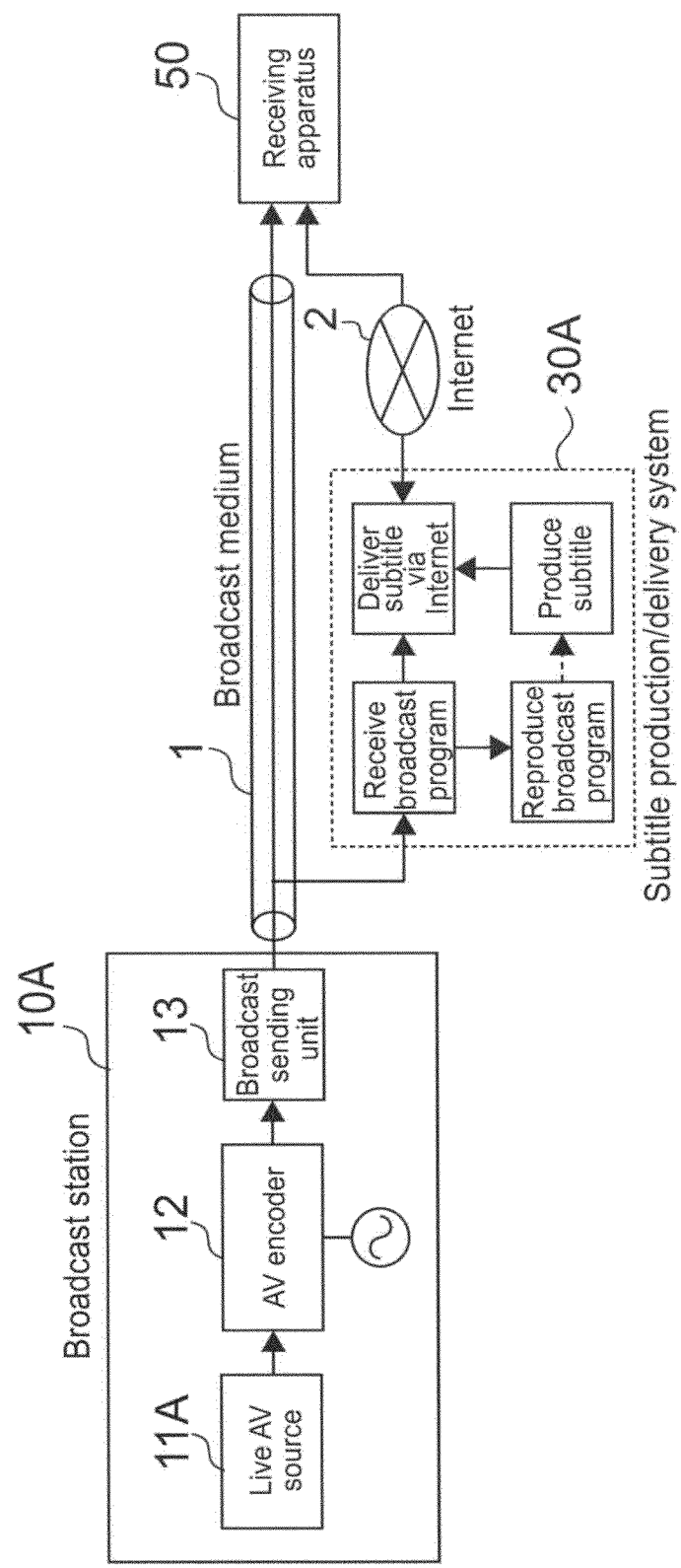
FIG. 2 is a diagram showing a subtitle transmitting system, which supports live broadcasting.

FIG. 2 is a diagram showing a subtitle transmitting system, which supports the above-mentioned live broadcasting.

A broadcast station 10A obtains a live AV source 11A, which is obtained from a filming system (not shown). The AV encoder 12 encodes the live AV source 11A in real time.

The broadcast sending unit 13 sends program data via the broadcast medium 1. A subtitle production/delivery system 30A receives and reproduces the broadcast live program. The subtitle production/delivery system 30A produces subtitle data while the subtitle production/delivery system 30A reproduces the live program. The subtitle production/delivery system 30A delivers the produced subtitle data to the receiving apparatus 50 via the Internet 2. According to this scheme, subtitles are thus transmitted at a timing behind time, at which the subtitles should be displayed per se, by at least processing time by the subtitle production/delivery system 30A. Because of this, it is difficult for the receiving apparatus 50 to display subtitles in synchronization with a broadcast program.

Figure 3:
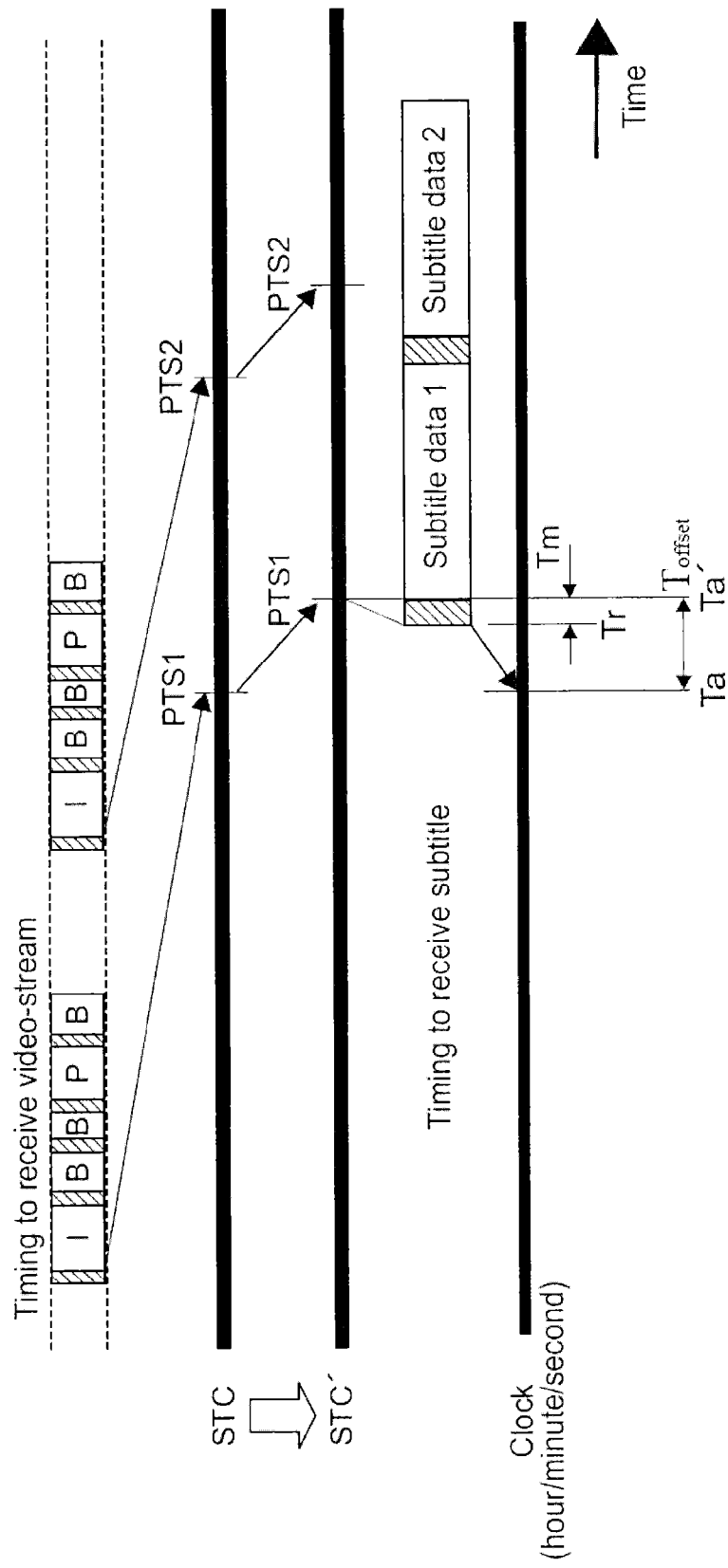
FIG. 3 is a time chart showing how a receiving apparatus of an embodiment of the present technology synchronizes a broadcast program and subtitles.

FIG. 3 is a time chart showing how a receiving apparatus according to this embodiment of the present technology synchronizes a broadcast program and subtitles.

The time (present time) of a clock of the receiving apparatus is behind the specified-display-time for subtitles. In this case, the receiving apparatus of this embodiment reproduces the broadcast program later at least by the amount of time lag between the specified-display-time for subtitles and the present time. As a result, the receiving apparatus synchronizes a broadcast program and subtitles.

More specifically, the receiving apparatus calculates a time period, by which reproduction of a broadcast program is delayed, by using the following equations.

1. The receiving apparatus performs the following calculation with regard to the first subtitle data at a time when the receiving apparatus starts to obtain subtitles.

Ta (msec) is indicative of a specified-display-time for subtitles. Tr (msec) is indicative of the time of a clock of a receiving apparatus (time based on TOT (Time Offset Table), the TOT being multiplexed and transmitted via broadcasting). First, the receiving apparatus calculates an offset time (Toffset) (msec) by using the following equation.

$$Tr - Ta + Tm = Toffset \quad (1)$$

where Tm (msec) is indicative of a predetermined margin time including zero.

2. The receiving apparatus updates an STC (System Time Clock) with an offset time (Toffset) by using the following equation.

$$STC - Toffset \times 90 = STC' \quad (2)$$

Toffset is multiplied by 90 in order to map Toffset (msec) into a counter value of 90 KHz same as the STC.

3. The receiving apparatus updates the specified-display-time Ta for subtitles with time Ta' on a time axis of the STC' by using the following equation.

$$Ta + Toffset = Ta' \quad (3)$$

4. The receiving apparatus decodes and displays an image stream signal received via broadcasting at a time when a PES value of the image PES packet equals to the STC'. Meanwhile the receiving apparatus displays subtitle data by a browser at a time when the time of the clock of the receiving apparatus based on the TOT is Ta'.

Based on the above-mentioned processing, the receiving apparatus is capable of synchronizing a broadcast program and subtitles, and reproducing them.

[Configuration of Receiving Apparatus]

Next, the configuration of the receiving apparatus of this embodiment will be described.

Figure 4:
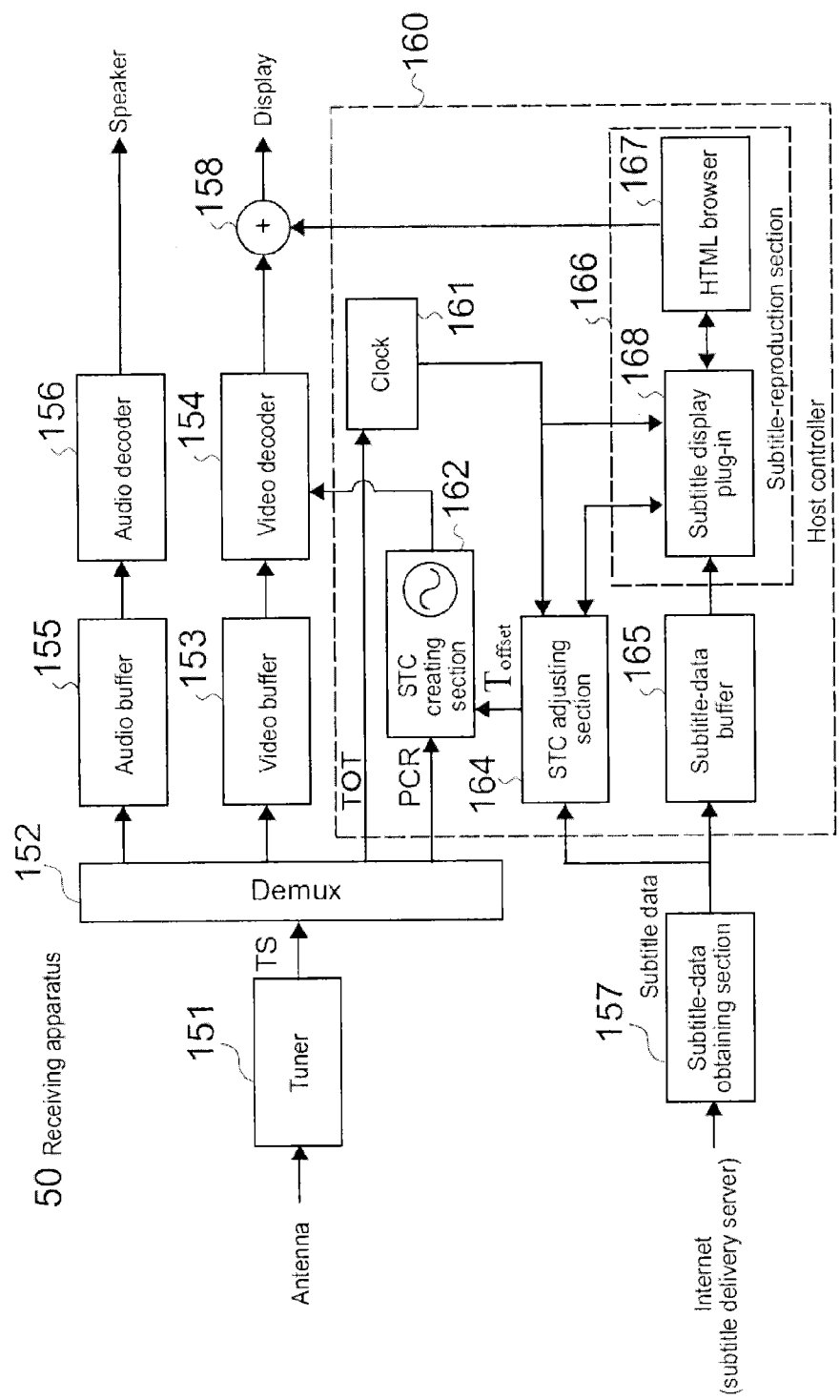
FIG. 4 is a block diagram showing the configuration of the receiving apparatus of this embodiment.

FIG. 4 is a block diagram showing the configuration of the receiving apparatus 50 of this embodiment.

A tuner 151 receives digital broadcast signals of a predetermined channel. The tuner 151 creates a transport stream (TS) based on the digital broadcast signal. The tuner 151 sends the created transport stream to a DeMUX 152. Note that the tuner 151 corresponds to a program receiving section.

The DeMUX 152 demultiplexes the transport stream to thereby obtain a video stream, an audio stream, SI (Service Information), and the like.

A video buffer 153 buffers the video stream obtained from the DeMUX 152.

A video decoder 154 extracts necessary data from the data held in the video buffer 153. The video decoder 154 decodes the video signal.

An audio buffer 155 buffers the audio stream obtained from the DeMUX 152.

An audio decoder 156 extracts necessary data from the audio stream held in the audio buffer 155. The audio decoder 156 decodes the audio signal.

Note that the video decoder 154 and the audio decoder 156 correspond to a program reproduction section.

A subtitle-data obtaining section 157 obtains subtitle data from the subtitle delivery server 40 (FIG. 1) or the subtitle production/delivery system 30A (FIG. 2) via a network such as the Internet.

A host controller 160 includes a CPU (Central Processing Unit), a ROM (Read Only Memory), a RAM (Random Access Memory), and the like. The ROM is a fixed memory, and stores data and programs executed by the CPU. The programs stored in the ROM are loaded in the RAM. The CPU executes the loaded program.

The programs loaded in the RAM cause the host controller 160 to function as a clock 161, an STC creating section 162, an STC adjusting section 164, a subtitle-data buffer 165, and a subtitle-reproduction section 166. Note that the STC creating section 162 and the STC adjusting section 164 correspond to a reproduction-time shifting section.

The clock 161 adjusts time (hour/minute/second) with reference to a TOT (Time Offset Table) in the SI, which is obtained from the DeMUX 152.

The STC creating section 162 creates an STC (System Time Clock) of 27 MHz with reference to a PCR (Program Clock Reference) in the SI, which is obtained from the DeMUX 152. The STC creating section 162 provides the STC to the video decoder 154, the audio decoder 156, and the like.

The STC adjusting section 164 calculates the above-mentioned offset time (Toffset) based on the specified-display-time in the obtained subtitle data and based on the time of the clock 161. The STC adjusting section 164 provides the calculated offset time (Toffset) to the STC creating section 162 and the subtitle-reproduction section 166.

The STC creating section 162 updates the STC with the STC' with reference to the offset time (Toffset). The STC creating section 162 provides the STC' to the video decoder 154, the audio decoder 156, and the like. The video decoder 154 decodes a video signal in a case where a time stamp (PTS: Presentation Time-Stamp) in the video stream coincides with the STC'. The video decoder 154 outputs the decoded video signal to a display unit. Similarly, the audio decoder 156 decodes an audio signal in a case where a time stamp in the audio stream coincides with the STC'. The audio decoder 156 outputs the decoded audio signal to a speaker unit.

The subtitle-data buffer 165 buffers the obtained subtitle data.

The subtitle-reproduction section 166 includes an HTML browser 167, a subtitle display plug-in 168, and the like. The HTML browser 167 interprets an HTML (HyperText Markup Language) document, for example, and creates display data. The subtitle display plug-in 168 is a program for expansion. That is, the subtitle display plug-in 168 adds a function of interpreting and displaying subtitle data to the HTML browser 167. The subtitle display plug-in 168 of the subtitle-reproduction section 166 adds an offset time (Toffset), which is provided by the STC adjusting section 164, to the specified-display-time Ta for subtitles. As a result, the subtitle-reproduction section 166 updates the specified-display-time Ta for subtitles with the specified-display-time Ta' on a time axis of the updated STC'. Then, the subtitle-reproduction section 166 creates subtitle display data when the updated specified-display-time Ta' coincides with the present time Tr of the clock 161. The subtitle-reproduction section 166 outputs the created subtitle display data to a superimposing section 158.

The superimposing section 158 superimposes the subtitle display data obtained from the subtitle-reproduction section 166 on the video signal obtained from the video decoder 154. The superimposing section 158 outputs the superimposed data to an external display unit or a built-in display unit of the receiving apparatus 50, for example.

[How to Display Broadcast Program and Subtitles]

Next, how the receiving apparatus 50 of this embodiment displays a broadcast program and subtitles will be described.

The HTML browser 167 of the receiving apparatus 50 obtains an HTML document from a server in the Internet. Examples of the HTML document include HTML5, which structures an application in conjunction with broadcasting.

The HTML browser 167 displays a broadcast image on a display in full-screen or in small-screen, based on the description of the HTML document.

FIG. 5 is a diagram showing an example of description of the HTML5 document, which structures an application in conjunction with broadcasting. The description of the HTML5 document of FIG. 5 relates to how to display subtitles.

An HTML document 60 describes information 61, 62, 63, and the like. The information 61 is information on display of buttons for switching on/off of display of subtitles. The information 62 identifies a subtitle file in the format of WebVTT (Video Text Tracks) or the like, and a program corresponding thereto. The information 63 is information on behaviors in response to operations on the buttons.

Figure 6:
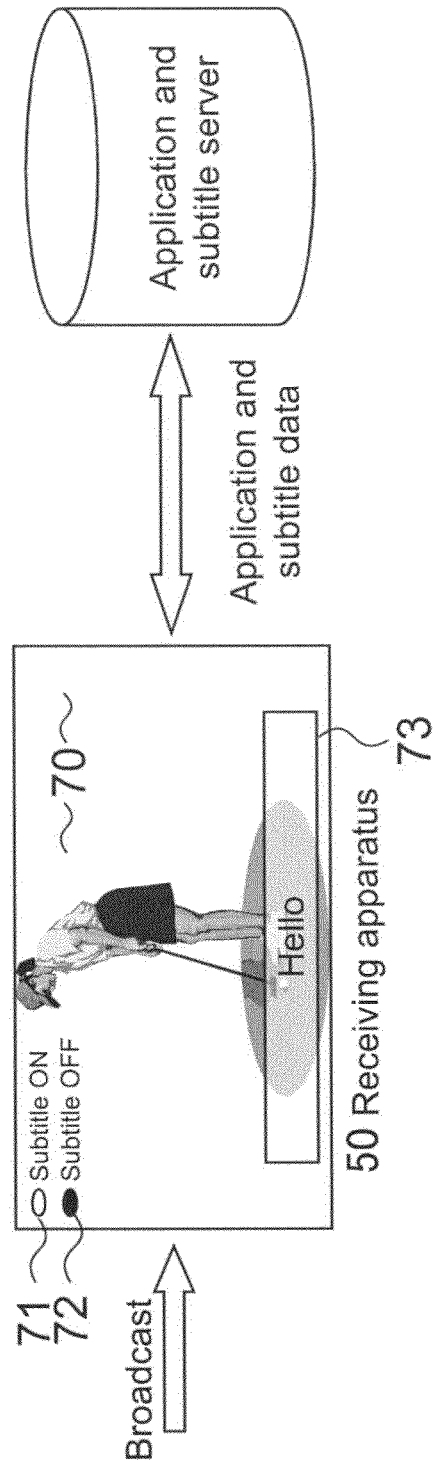
FIG. 6 is a diagram showing a display example of user interfaces for switching on/off of display of subtitles, and subtitles.

FIG. 6 is a diagram showing a display example of user interfaces for switching on/off of display of subtitles, and subtitles.

The HTML browser 167 superimposes buttons 71, 72 for switching on/off of display of subtitles on an image 70 of a broadcast program based on the information 61 described in the HTML document, to thereby display the superimposed image. A user operates the button 71 to thereby specify "on" of display of subtitles. Then, the HTML browser 167 starts the subtitle display plug-in 168 based on the information 63 described in the HTML document. The subtitle display plug-in 168 causes the host controller 160 to obtain subtitle data (subtitle file) from the subtitle delivery server 40, based on the information 63 described in the HTML document. After that, the subtitle display plug-in 168 causes the host controller 160 to display a subtitle 73 corresponding to the image at the time specified in the obtained subtitle data (specified-display-time).

Figure 7:
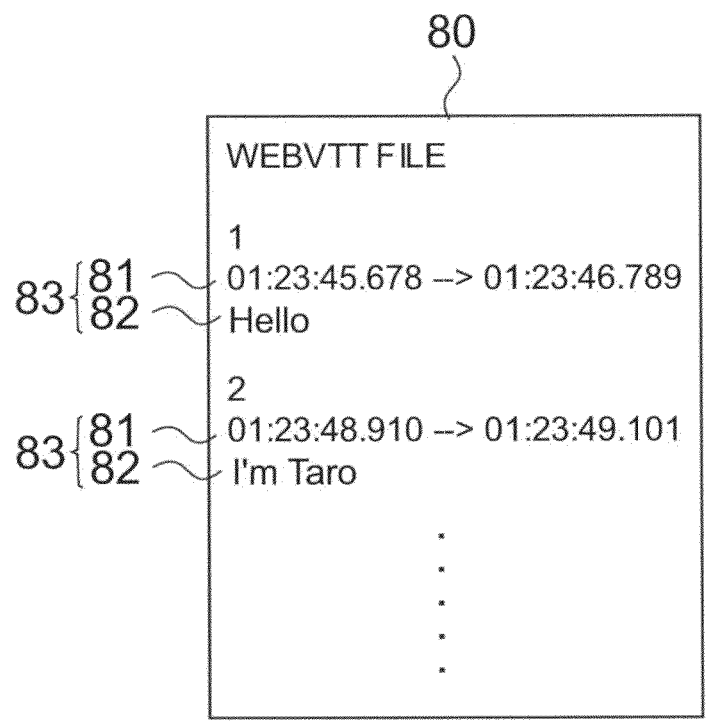
FIG. 7 is a diagram showing the structure of a subtitle file.

FIG. 7 is a diagram showing the structure of a subtitle file.

A subtitle file 80 describes pieces of subtitle data 83 in a time-oriented manner. Each subtitle data 83 includes a pair of specified-display-time 81 and a subtitle data body 82. The specified-display-time 81 holds a value of subtitle-display-start time and a value of subtitle-display ending time. For example, the specified-display-time 81 is time produced by the subtitle production system 30 based on a TOT (Time Offset Table) inserted in a transport stream of a broadcast program.

The host controller 160 of the receiving apparatus 50 holds a session for transmitting a subtitle file, which is established between the receiving apparatus 50 and the subtitle delivery server 40, until the entire accessed subtitle data (subtitle file) is transmitted. That is, in a case of transmitting a subtitle file from the subtitle delivery server 40, if, specifically, a program is a live program, subtitle data is successively produced and transmitted by the subtitle production/delivery system 30A as time passes. The receiving apparatus 50 obtains transmitted subtitle data, and records the newly obtained subtitle data in an already-obtained file. The receiving apparatus 50 repeats this process until the receiving apparatus 50 receives EOF (End Of File).

[How to Synchronize Broadcast Program and Subtitles]

Next, how the receiving apparatus 50 reproduces subtitles and a broadcast program in synchronization with each other, in a case where transmission of subtitle data is behind transmission of a broadcast program, will be described.

The subtitle-data obtaining section 157 obtains subtitle data, and provides the obtained subtitle data to the host controller 160. In the host controller 160, the subtitle-data buffer 165 buffers the obtained subtitle data, and the subtitle-data obtaining section 157 provides the subtitle data to the STC adjusting section 164.

The STC adjusting section 164 extracts the specified-display-time for subtitle data, which is transmitted at the end of a subtitle file. The STC adjusting section 164 compares the specified-display-time with the time (present time) of the clock 161. Note that the specified-display-time used for comparison here is the display-start time, for example. Alternatively, the specified-display-time used for comparison may be the display-ending time or the time between the display-start time and the display-ending time.

The STC adjusting section 164 calculates the offset time (Toffset) based on the specified-display-time for subtitle data and the time of the clock 161 based on Equation (1).

In a case where the specified-display-time is not behind the time of the clock 161 (present time), the offset time (Toffset) is zero. In this case, the STC adjusting section 164 provides the offset time (Toffset) "zero" to the STC creating section 162 and the subtitle display plug-in 168. Alternatively, the STC adjusting section 164 does not provide the offset time (Toffset) to the STC creating section 162 and the subtitle display plug-in 168. As a result, the STC creating section 162 does not change the STC (System Time Clock). In addition, the subtitle display plug-in 168 does not update the specified-display-time for subtitles.

FIG. 3 shows an example in which the specified-display-time Ta is behind the time of the clock 161 (present time). In this case, the STC adjusting section 164 provides an offset time (Toffset) (positive value) to the STC creating section 162 and the subtitle display plug-in 168. In this case, the STC creating section 162 subtracts the offset time (Toffset) from the STC (System Time Clock) to thereby obtain STC'. The STC is updated with STC'.

As a result, the video decoder 154 and the audio decoder 156 decode data based on the STC' after that. That is, a broadcast program is reproduced behind the original time, which is based on the STC, by the amount of the offset time (Toffset). The amount of the offset time (Toffset) equals to the amount of the time lag between the STC and the STC'.

Meanwhile, the subtitle-reproduction section 166 adds the offset time (Toffset), which is provided by the STC adjusting section 164, to the specified-display-time Ta extracted from the subtitle data. The subtitle-reproduction section 166 updates the specified-display-time with the time Ta' in conformity with the time axis of the STC'. The subtitle-reproduction section 166 similarly updates the specified-display-time for other subtitle data after that.

As a result, it is possible to reproduce a broadcast program and subtitles in synchronization with each other. That is, the difference between the specified-display-time for subtitles and the time of the clock of the receiving apparatus corresponds to, for example, the time to create and deliver one piece of subtitle data by the subtitle production/delivery system 30A. In view of this, a margin time Tm is added to the differential time to thereby calculate an offset time (Toffset). Specifically, the margin time Tm relates to variation of time to create one piece of subtitle data. The receiving apparatus decodes a video stream and an audio stream behind the original time by the offset time (Toffset). As a result, it is possible to reproduce a broadcast program and subtitles in synchronization with each other over the entire time of a broadcast program.

Note that the STC' is returned to the original STC at the same time as the end of a broadcast program, which is decoded based on the STC'. Alternatively, the STC' may be returned to the STC along with the end of subtitle data.

Figure 8:
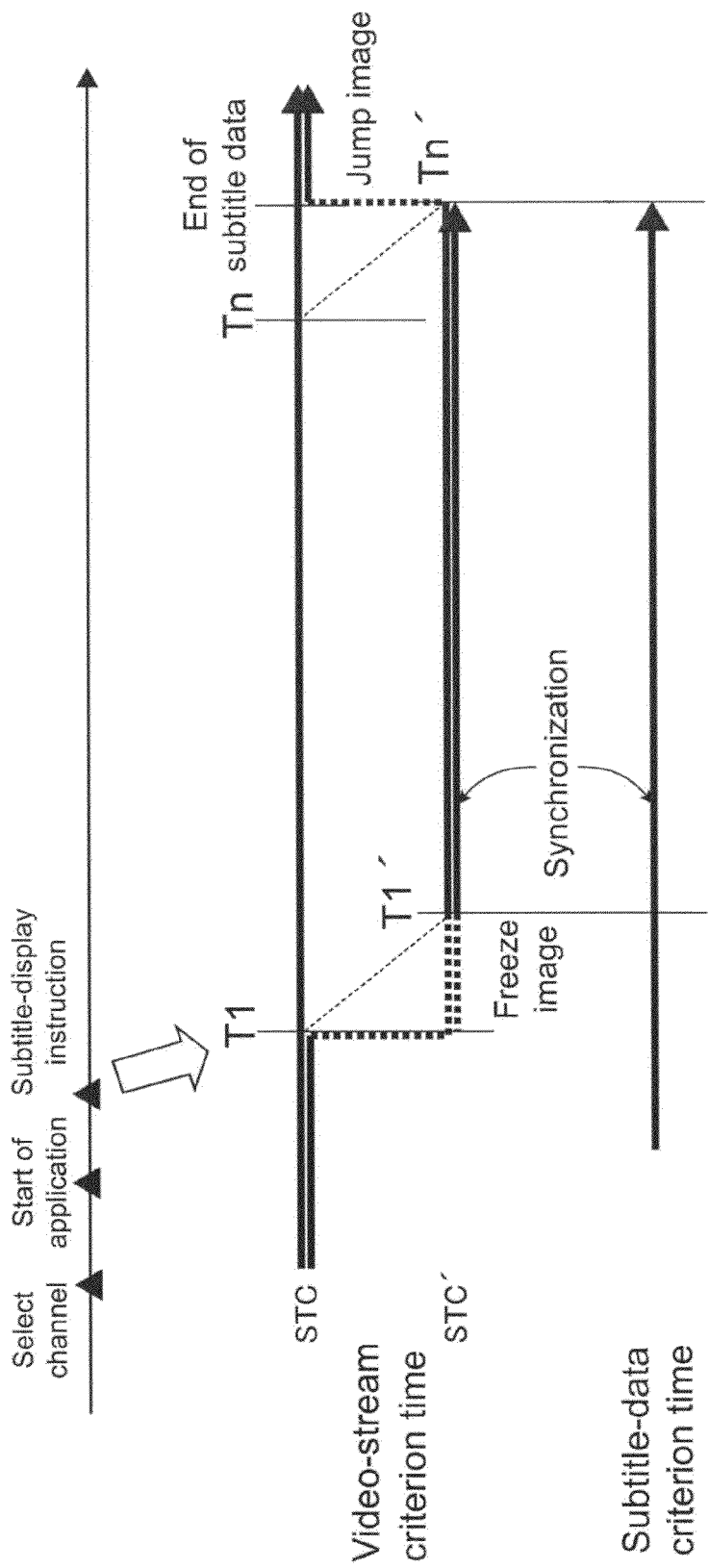
FIG. 8 is a timing chart showing how to decode a video stream from generation of an instruction to turn on subtitle display to the end of subtitle data.

FIG. 8 is a timing chart showing how to decode a video stream from generation of an instruction to turn on subtitle display to the end of subtitle data. FIG. 8 shows an example in which the STC' is returned to the STC along with the end of subtitle data.

The receiving apparatus 50 updates the STC with the STC'. As a result, the time to start decoding a video stream (T1) is displaced to T1'. An image is displayed in a freeze status from T1 to T1'. Then, decoding of the video stream is restarted at the time T1'. After that, the video stream is decoded while the time is still displaced, until the end of the subtitle data. After the end of the subtitle data, the STC' is returned to the STC. The receiving apparatus 50 jumps to an access unit, whose time stamp (PTS) coincides with the STC, and decodes the access unit.

MODIFIED EXAMPLE 1

In the above-mentioned embodiment, the specified-display-time Ta for subtitles is updated with the time Ta'. Ta' is obtained by adding the offset time (Toffset) to Ta. As a result, Ta' corresponds to the updated STC' time axis. However, the specified-display-time Ta for subtitles may not be updated in a case where, for example, a margin time Tm is not a large value and scenes are thus not displaced from subtitles. That is, according to the present technology, it is not always necessary to update the specified-display-time Ta for subtitles with offset time (Toffset).

MODIFIED EXAMPLE 2

After the STC is updated with the STC' with reference to the offset time, the specified-display-time Ta' for subtitle data, which is updated by the STC adjusting section 164, may be compared with the time of the clock 161 (present time). The offset time (Toffset) may thus be calculated. If the updated specified-display-time Ta' is behind the time of the clock 161 (present time), the STC adjusting section 164 obtains offset time (Toffset) (positive value), again. Further, the STC creating section 162 subtracts the offset time (Toffset) from the STC' to thereby obtain a new updated value STC", again. After that, the similar STC update processing is performed until the end of transmitted subtitle data.

Note that the present technology may employ the following configurations.

(1) A receiving apparatus, comprising:
a program receiving section configured to receive broadcast program data;
a program reproduction section configured to reproduce the received program data;
a clock functioning as a timer;
a subtitle-data obtaining section configured to obtain subtitle data via a network, the subtitle data corresponding to the program data, time to display the subtitle data being previously specified; and
a reproduction-time shifting section configured to delay, in a case where the time to display the obtained subtitle data is behind time of the clock, time to reproduce the program data by the program reproduction section for at least a time lag between time to display the subtitle data and time of the clock.

(2) The receiving apparatus according to (1), wherein
the reproduction-time shifting section is configured to delay time to reproduce the program data by the program reproduction section for offset time, the offset time being obtained by adding a predetermined margin to a time lag between time to display the subtitle data and time of the clock.

(3) The receiving apparatus according to (1) or (2), further comprising
a subtitle-reproduction section configured
to update the display time previously specified to the obtained subtitle data with time obtained by adding the offset time to the display time, and
to display the subtitle data at the updated display time.

(4) The receiving apparatus according to any one of (1) to (3), wherein
the reproduction-time shifting section is configured
to convert offset time into a 90 KHz counter value, the offset time being obtained by adding a predetermined margin to a time lag between time to display the subtitle data and time of the clock, and
to delay an STC (System Time Clock).

(5) The receiving apparatus according to any one of (1) to (4), wherein
the reproduction-time shifting section is configured to return the STC to an original value along with end of one of the program data and the subtitle data.

(6) The receiving apparatus according to any one of (1) to (5), wherein
the reproduction-time shifting section includes
an STC adjusting section configured to calculate the offset time, and
an STC creating section configured
to create the STC with reference to a PCR (Program Clock Reference), the PCR being inserted in the broadcast program data and transmitted, and
to update the STC with the offset time given from the STC adjusting section.

The present disclosure contains subject matter related to that disclosed in Japanese Priority Patent Application JP 2012-033007 filed in the Japan Patent Office on Feb. 17, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A receiving apparatus, comprising:
a clock; and
circuitry configured to
receive broadcast program data;
reproduce the received program data;
obtain subtitle data via a network, the subtitle data corresponding to the program data at a previously specified timing;
calculate an offset time, $T_{offset}$, by the following equation:

$$T_{offset} = T_r - T_a + T_m,$$

where $T_a$ is a display time of the obtained subtitle data, $T_r$ is a time of the clock and $T_m$ is a predetermined margin time; and
delay, when the display time of the obtained subtitle data is behind the time of the clock, a time to reproduce the program data by the offset time, $T_{offset}$.

2. The receiving apparatus according to claim 1, wherein the circuitry is further configured to calculate a modified display time, $T_a'$, by the following equation:

$$T_a' = T_a + T_{offset}, \text{ and}$$

display the subtitle data at the modified display time, $T_a'$.

3. The receiving apparatus according to claim 1, wherein the circuitry is further configured to
convert the offset time, $T_{offset}$, into a 90 KHz counter value, the offset time being obtained by adding a predetermined margin to the time lag, and
delay a system time clock (STC).

4. The receiving apparatus according to claim 3, wherein the circuitry is further configured to
return the STC to an original value when one of the program data and the subtitle data is complete.

5. The receiving apparatus according to claim 3, wherein the circuitry is further configured to
calculate the offset time, $T_{offset}$,
create the STC with reference to a program clock reference (PCR), the PCR being inserted in the broadcast program data and transmitted, and
update the STC with the offset time, $T_{offset}$.

6. A subtitle processing method, comprising:
receiving broadcast program data;
obtaining, by circuitry, subtitle data via a network, the subtitle data corresponding to the program data at a previously specified timing;
calculating, by the circuitry, an offset time, $T_{offset}$, by the following equation:

$$T_{offset} = T_r - T_a + T_m,$$

where $T_a$ is a display time of the obtained subtitle data, $T_r$ is a time of the clock and $T_m$ is a predetermined margin time; and
delaying, by the circuitry, when the display time of the obtained subtitle data is behind the time of the clock, a time to reproduce the program data by the offset time, $T_{offset}$.

7. The receiving apparatus according to claim 1, wherein the predetermined margin time corresponds to a processing time to create the subtitle data.

8. The receiving apparatus according to claim 1, wherein the circuitry is further configured to
display a user interface including selectable buttons for turning on or turning off the display of the subtitle data, and
receive an input via the user interface.

9. The receiving apparatus according to claim 8, wherein the circuitry is further configured to,
display the subtitle data and the delayed program data such that the subtitle data is superimposed upon the delayed program data when the input indicates turning on the display of subtitle data, and
display the delayed program data without the subtitle data when the input indicates turning off the display of subtitle data.

10. The receiving apparatus according to claim 1, wherein the circuitry is further configured to
display the program data in a frozen state for a period of time equal to the offset time, $T_{offset}$, and
restart the program data and display the restarted program data and the subtitle data when the period of time has expired.

11. A non-transitory computer readable medium storing computer readable instructions that, when executed by a computer including circuitry, cause the computer to execute a process, the process comprising:
receiving broadcast program data;
obtaining subtitle data via a network, the subtitle data corresponding to the program data at a previously specified timing;
calculating an offset time, $T_{offset}$, by the following equation:

$$T_{offset} = T_r - T_a + T_m,$$

where $T_a$ is a display time of the obtained subtitle data, $T_r$ is a time of the clock and $T_m$ is a predetermined margin time; and
delaying, when the display time of the obtained subtitle data is behind the time of the clock, a time to reproduce the program data by the offset time, $T_{offset}$.

* * * * *